US006993744B2

(12) United States Patent
Hills

(10) Patent No.: US 6,993,744 B2
(45) Date of Patent: Jan. 31, 2006

(54) METHOD FOR ENABLING A COMPILER OR INTERPRETER TO USE IDENTIFIERS FOUND AT RUN TIME IN A MAP CONTAINER OBJECT IN A MANNER SIMILAR OR IDENTICAL TO IDENTIFIERS DECLARED AT COMPILE TIME

(75) Inventor: Theodore S. Hills, Lambertville, NJ (US)

(73) Assignee: Tajen Corporation, Princeton, NJ (US)

( * ) Notice: Subject to any disclaimer, the term of this patent is extended or adjusted under 35 U.S.C. 154(b) by 737 days.

(21) Appl. No.: 09/741,201

(22) Filed: Dec. 19, 2000

(65) Prior Publication Data

US 2002/0133809 A1   Sep. 19, 2002

(51) Int. Cl.
*G06F 9/44* (2006.01)

(52) U.S. Cl. ............... 717/108; 717/139; 717/717; 717/140; 709/203

(58) Field of Classification Search ............... 717/108, 717/140–160; 709/200–203
See application file for complete search history.

(56) References Cited

U.S. PATENT DOCUMENTS

| | | | | |
|---|---|---|---|---|
| 4,667,290 A | | 5/1987 | Goss et al. ............... 717/147 |
| 5,577,233 A | | 11/1996 | Goettelmann et al. ........ 703/26 |
| 5,692,180 A | * | 11/1997 | Lee ............... 707/10 |
| 5,774,726 A | | 6/1998 | Ahmed ............... 717/143 |
| 5,812,851 A | | 9/1998 | Levy et al. ............... 717/147 |
| 5,857,197 A | | 1/1999 | Mullins ............... 707/103 R |
| 5,889,995 A | * | 3/1999 | Segnan ............... 717/141 |
| 5,918,035 A | | 6/1999 | Van Praet et al. ............... 703/22 |
| 5,930,795 A | | 7/1999 | Chen et al. ............... 707/100 |
| 5,946,489 A | | 8/1999 | Yellin et al. ............... 717/147 |
| 5,991,802 A | * | 11/1999 | Allard et al. ............... 709/219 |
| 6,003,038 A | | 12/1999 | Chen ............... 707/103 R |
| 6,052,526 A | | 4/2000 | Chatt ............... 717/136 |
| 6,061,519 A | | 5/2000 | Rathnam ............... 717/142 |
| 6,173,313 B1 | * | 1/2001 | Klots et al. ............... 709/203 |
| 6,356,913 B1 | * | 3/2002 | Chu et al. ............... 707/103 R |
| 6,427,229 B1 | * | 7/2002 | Brobst et al. ............... 717/108 |
| 6,587,928 B1 | * | 7/2003 | Periyannan et al. ........ 711/138 |
| 2001/0037412 A1 | | 11/2001 | Miloushev et al. ........... 345/63 |

FOREIGN PATENT DOCUMENTS

WO   PCT/US01/49044   10/2002   ............... 717/100

OTHER PUBLICATIONS

"D Programming Language"—Digital Mars, 1999-2002.

* cited by examiner

*Primary Examiner*—Kakali Chaki
*Assistant Examiner*—Lawrence Shrader
(74) *Attorney, Agent, or Firm*—Cantor Colburn LLP

(57) ABSTRACT

A method for enabling a compiler or interpreter to use identifiers found at run time in a map container object in a manner similar or identical to identifiers declared at compile time is presented. More specifically, names defined in a map container object during the execution of a program are treated in a manner similar or identical to names defined in a programming namespace at compilation (or interpretation) time. The map container is applied to encapsulate a non-programming namespace application programming interface (API), so that names defined in a non-programming namespace can be treated in a manner similar or identical to names defined in a programming namespace at compilation (or interpretation) time.

15 Claims, 1 Drawing Sheet

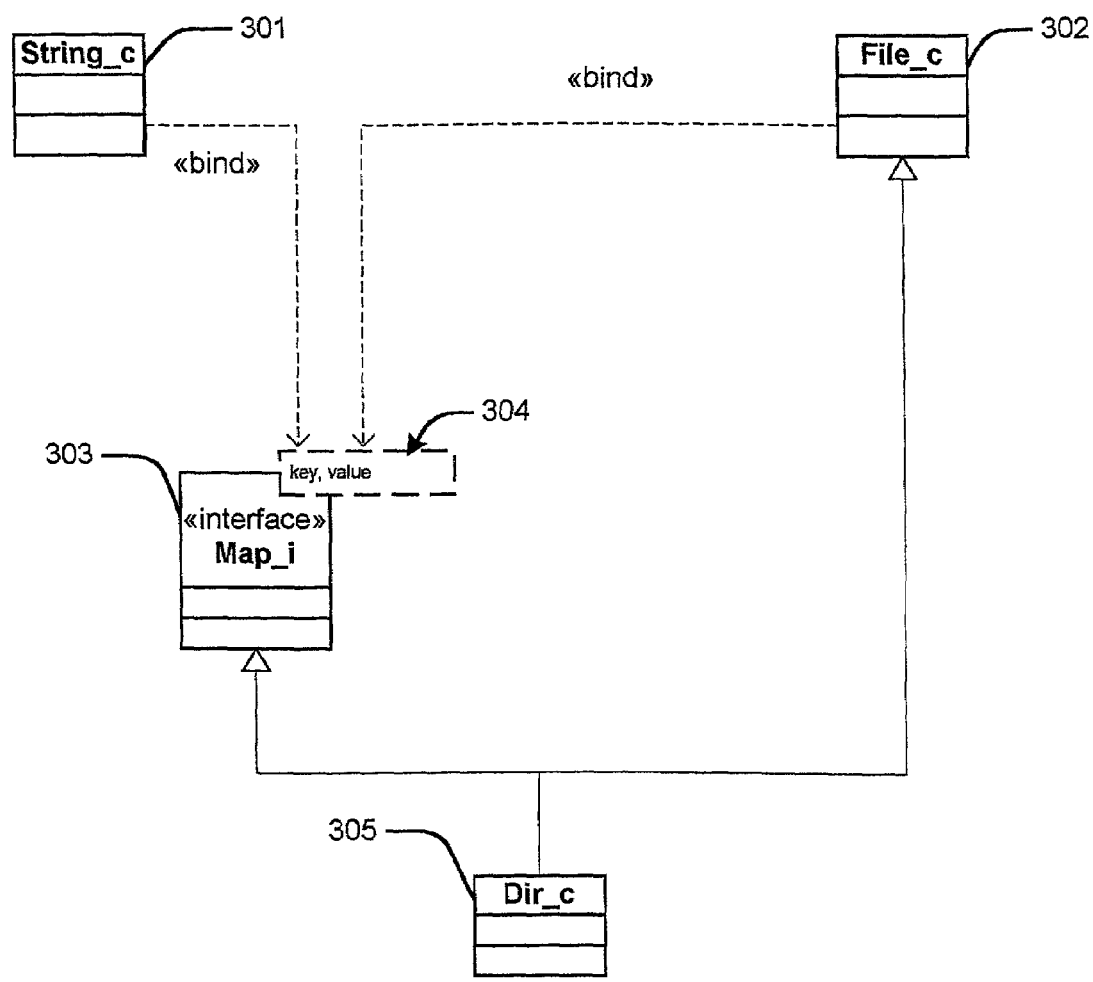
FIGURE

METHOD FOR ENABLING A COMPILER OR INTERPRETER TO USE IDENTIFIERS FOUND AT RUN TIME IN A MAP CONTAINER OBJECT IN A MANNER SIMILAR OR IDENTICAL TO IDENTIFIERS DECLARED AT COMPILE TIME

BACKGROUND OF THE INVENTION

This invention relates generally to programming of digital computers, and, more particularly, to a method for enabling compilers or interpreters to use identifiers found at run time in a map container object in a manner similar or identical to identifiers declared at compile time.

In the abstract, a namespace is a space within which names are defined, can be differentiated from each other, and have unique identity. Programming languages always define at least one namespace, allowing names to be defined which are differentiated from each other, and which are used to identify nameable entities in the namespace. Many programming languages, including C++ and Java®, support multiple namespaces, either explicitly or implicitly, or both. (Java® is a registered trademark of Sun Microsystems, Inc.) For instance, C++ treats every class as its own namespace, and additionally includes a namespace definition declaration, allowing the definition of previously non-existent namespaces, in which new unique names may be defined.

Various systems and subsystems implemented in computers, other than programming languages, support namespaces, which identify by (typically human-readable) character strings objects of classes supported by those subsystems. For example, a hierarchical filesystem provided by an operating system supplies a namespace where each name identifies either a file (a sequence of bytes on a storage medium) or a directory containing files and other directories. As another example, the IEEE POSIX® operating system specification, as defined by "IEEE/ANSI Std 1003.1, 1996 Edition: Information Technology—Portable Operating System Interface (POSIX&)—Part 1: System Application: Program Interface (API) [C Language]", which is incorporated herein by reference, defines an "environment" that supplies a namespace where each name identifies an arbitrary string of characters of any length. (POSIX® is a registered trademark of The Institute of Electrical and Electronic Engineers, Inc.) As a further example, Uniform Resource Identifiers (URIs) defined by "IEC RFC 2396: Uniform Resource Identifiers (URI): Generic Syntax", which is incorporated herein by reference, define a namespace encompassing the entire Internet, such that any object reachable via the Internet may be named. As a further example, CORBA®, as defined by Object Management Group, "The Common Object Request Broker: Architecture and Specification, Minor revision 2.3.1", Needham, Mass., Object Management Group, October 1999, which is incorporated herein by reference, defines an Interface Repository, containing named definitions of interfaces and other related objects, which are named by human-readable identifiers. (CORBA® is a registered trademark of Object Management Group, Inc.) These namespaces hereinafter will be referred to as "non-programming namespaces".

It is desirable that computer programs can access objects in these non-programming namespaces, in order to find objects by name, to read and write the objects, to create and delete named objects, and to invoke methods defined on the objects. To this end, it is customary that for a given computer programming language (such as C++ or Pascal), and a given kind of non-programming namespace (such as a filesystem), an application programming interface (API) to that namespace is defined. Such an API typically defines a function for each of the aforementioned operations. The functions that locate named objects in a non-programming namespace often accept as arguments strings of characters which are the names of objects sought. These strings are not considered names in the source programming language used to program the function calls. Therefore, objects defined in non-programming namespaces are named, created, deleted, and manipulated using function calls the meaning of which is defined entirely outside the source programming language. By contrast, objects defined using the source programming language are named, created, deleted, and manipulated using statements defined by the language itself, and those statements are interpreted by a compiler or interpreter of the language. As a result, much of the expressiveness of a programming language cannot be employed by program source code which manipulates objects in a non-programming namespace. Additionally, no uniformity exists in referencing by name objects defined using a programming language versus objects defined outside a programming language.

In practice to date, among APIs to a number of non-programming namespaces defined for a single programming language, there is little or no commonality between the functions of distinct APIs intended to perform similar or identical operations on the objects of their respective non-programming namespaces.

Accordingly, there is a need for a mechanism that provides access to objects and their names defined in non-programming namespaces, which is integrated with access to objects and their names defined in programming namespaces, and which is uniform across disparate kinds of namespaces.

BRIEF SUMMARY OF THE INVENTION

The above-discussed and other drawbacks and deficiencies of the prior art are overcome or alleviated by the method of the present invention for enabling a compiler or interpreter to use identifiers found at run time in a map container object in a manner similar or identical to identifiers declared at compile time. In accordance with the present invention, names defined in a map container object during the execution of a program can be treated in a manner similar or identical to names defined in a programming namespace at compilation (or interpretation) time.

More specifically, when a compiler (or interpreter) incorporating the present invention encounters a locally scoped identifier, it applies static name resolution rules as defined in the programming language definition. If it does not resolve the identifier statically, and one or more map object container objects have been incorporated into the current scope through "namespace using directives", the compiler generates code as follows. Firstly, the compiler regards the identifier as a reference to an object which is to be discovered at execution time. When generating object code for source code referencing the identifier, the compiler generates code that accesses the referenced object indirectly, through a reference object associated with the identifier, whose value can be set at run time. Secondly, the compiler generates code to search at run time the map containers incorporated into the current scope through "namespace using directives" for a key whose value is a string equal to the identifier string. If the generated code finds a matching key in the container, it sets the reference variable associated with the identifier to reference the object corresponding to the key found. If a match is not found, an exception is thrown. After successful assignment to the reference variable, the identifier may be used to reference the object found through its associated reference variable, just as if the identified object had been known at compile time.

Additionally, the compiler may interpret a "namespace using declaration" that explicitly references a map container object, by generating code as described above, searching only the explicitly referenced map container object for the identifier appearing in the "namespace using declaration".

The present invention contemplates immediate useful application to encapsulating access to non-programming namespaces such as filesystems, environment variables, Internet URIs, run-time object name resolution schemes, etc.

The above-discussed and other features and advantages of the present invention will be appreciated and understood by those skilled in the art from the following detailed description and drawings.

BRIEF DESCRIPTION OF THE DRAWINGS

The FIGURE is a static structure chart in the Unified Modeling Language (UML) for a filesystem directory defined as a special kind of file which is also a map container object in accordance with the present invention.

DESCRIPTION OF THE PREFERRED EMBODIMENT

An embodiment of the invention may be described with respect to any traditional object-oriented programming language. For the purpose of describing the invention herein, a new programming language, hereinafter called "D", will be used. The "D" programming, language is the subject of a related application Ser. No. 09/741,502 entitled "COMPUTER PROGRAMMING LANGUAGE TO DESCRIBE AND ENCAPSULATE A COMPUTER AS A SET OF CLASSES AND OBJECTS" which is being filed concurrently herein, and which is incorporated herein by reference. This language has syntax similar to that of C++.

Preferably the D language compiler allows reference at run time to objects in a map container, such objects found in the map container with string keys conformant to the compiler's source language lexical requirements for identifiers, such string keys supplied in the source code to the compiler as identifiers.

An embodiment of the invention may be described with respect to any non-programming namespace. For the purpose of describing the invention herein, a POSIX-compliant filesystem is used herein as an exemplary embodiment.

As an aid to understanding the teaching in this document, in the following sections characters enclosed in single quotation marks, as in 'this text', are to be interpreted as characters which could appear in the source code of a D language program exactly as shown in this text, without the enclosing single quotation marks.

Map Container Objects

A container object is an object which can contain other objects. There can be many kinds of container objects, distinguished primarily by how the objects are organized inside the container—whether as a sequential list, a set of unique values, or some other means. The container object of interest here is called a "map". This is a container of pairs of objects. The first object of each pair is called the "key", and the second object is called the "value". Within a single map container, each key is guaranteed to be unique, so that a key uniquely identifies an object in the map.

In an object-oriented implementation of a map container, all keys are constrained to be of a single class (or its substitutable subclasses), and likewise all values are constrained to be of a single class (or its substitutable subclasses). The key and value classes do not necessarily have any relation to each other: they can be the same class or different classes.

Table 1 below shows source code in the D language for an interface to a class implementing a map container. The interface itself has two parameters: 'Key_c' and 'Class_c'. Both of these are of class 'Class_c', the meta-class of classes. 'Key_c' and 'Class_c' supply the map's key class and value class, respectively.

TABLE 1

```
new Interface_c<? Class_c Key_c, Class_c Value_c ?> Map_i
(
  interface
  {
    function Subr_c<? returns Nat32_t nItems ?> size;
    function Subr_c<? Key_c Key, returns ptrTo (Value_c) pValue ?> find;
    method Subr_c<? ?> clear;
    method Subr_c<? Key_c Key, Value_c Value ?> insert;
    method Subr_c<? Key_c Key ?> remove;
  }
);
```

The function 'size' returns the number of objects in the container. The function 'find' returns a pointer to an object found in the container with key equal to the argument 'Key'. If no object in the container is associated with a key equal to 'Key', the pointer is set to null. The method 'clear' removes all objects from the container. The method 'insert' inserts a new object in the container in association with key value 'Key'. The method 'remove' removes from the container the object associated with key value 'Key'.

In the present invention, the class of key used is a string of characters, and the class of value is any arbitrary class. Table 2 below shows source code in the D language for a specialized version of interface 'Map_i' that specifies the key class as a string. The specialized version is identified as 'SymbolTable_i'.

TABLE 2

```
new Interface_c<? Class_c Value_c ?> SymbolTable_i
(
   interface extends (Map_i (String_c, Value_c))
   {
      method Subr_c<? Value_c Value, String_c Key (Value'Name) ?> insert
      ({ insert (Key, Value); });
      method Subr_c<? Value_c Value, String_c Key (Value'Name) ?> remove
      ({' remove (Key); });
   }
);
```

Class 'String_c' is a predefined class of the D programming language, and is the class of a string of characters. Class 'Value_c' is any class. By virtue of the declaration 'extends Map_i (String_c, Value_c)', the interface 'SymbolTable_i' is established as a specialized interface to a general map container, where the key class is always a string class. The interface literal for 'SymbolTable_i' provides overloaded versions of member methods 'insert' and 'remove' that depend on this fact. Both of these methods take two arguments, but the second argument has a default value, which is the name of the first actual argument in string form. This makes possible a shorthand form of invocation, where only a single argument is supplied to 'insert' or 'remove', and the identifier of the actual argument is taken to be the key value. Examples of the use of this shorthand form are presented below.

Inserting Objects into a Map Container

It is ordinary for a program to define a map container, whose keys are strings, and to insert named objects into the container. Table 3 below shows source code in the D programming language that defines a map container, whose keys are strings, and inserts named objects into the container.

TABLE 3

| | |
|---|---|
| new SymbolTable_i (Descriptor_c) aMap(); | ## line 1 |
| new Descriptor_c d1 (); | |
| aMap.insert ("d1", d1); | ## line 4 |
| new Descriptor_c d2 (); | |
| aMap.insert (d2); | ## line 7 |
| aMap.remove (d1); | ## line 9 |

Line 1 in Table 3 defines a symbol table object called 'aMap'. As has been seen in Table 2 above, a symbol table object is a map object having <key, value> pairs where the key class is 'String_c'. On line 1 of Table 3, the value class is declared to be 'Descriptor_c'. The empty parentheses at the end of the line invoke the map object's default constructor, which initializes the map to be an empty container. Likewise, the empty parentheses at the ends of lines 3 and 6 in Table 3 invoke the default initializers for those objects. They do not denote that these objects are functions, as similar syntactical usage would do in the C++ programming language.

Note the difference between the call to method 'insert' on line 4 vs. the call on line 7 in Table 3. On line 4 in Table 3, it is clearly seen that a <key, value> pair is being inserted into the map container object identified as 'aMap'. The identifier of the value, 'd1', is redundantly specified in the form of a string literal as the key to be associated with the object itself. This is an invocation of the 'insert' method defined in the interface literal for 'Map_i'.

On line 7 in Table 3, a version of the 'insert' method is invoked with only one argument, an instance of the map container's value class. This matches the overloaded version of the 'insert' method defined in the interface literal for 'SymbolTable_i'. This version of the 'insert' method receives not only the object referenced by the identifier 'd2', but also the identifier 'd2' itself as a string object, through the method's second, default argument. Since this overloaded 'insert' method is implemented in terms of the 'insert' method in 'Map_i', the two methods are known to be semantically equivalent.

The call in line 7 in Table 3 is not only more convenient for a programmer to write, but it also eliminates the possibility that the programmer will mistakenly use a different string as key than the actual identifier of the object.

Symbol Table as Map

Within every compiler is a symbol table, which is a table of the identifiers declared in the source code being compiled, and the definitions attached to those identifiers. Such a symbol table is a kind of map, where the key is the identifier string itself, and the value is the compiler's internal representation of the definition attached to the identifier.

Referencing Objects in a Map Container

Table 4 below is an example of two different, though equivalent, ways of referring to the named contents of the map object 'aMap'.

TABLE 4

| | |
|---|---|
| new Subr_c<? SymbolTable_i (Descriptor_c) aMap ?> M6 | |
| ({ | |
| new ptrTo (Descriptor_c) @ d2 (aMap.find ("d2")); | ## line 3 |
| using aMap::d1; | ## line 5 |

TABLE 4-continued

```
    using aNamespace::obj;                    ## line 7
});
```

Line 1 in Table 4 shows the definition of a new subroutine named 'M6', with a single argument, which is any map container of the same class as that declared in Table 3. For convenience of explanation, the name of the formal argument has been chosen to be the same as the name of the actual map container object in Table 3; that is, 'aMap'.

Line 3 in Table 4 declares a reference object called 'd2'. In the D language, a reference object is a pointer object declared with the suffix '@' on the expression giving the class of the pointer object. Every reference to an identifier of a pointer object, except an initializing reference, is implicitly a reference to the object which the pointer signifies. The D language definition prohibits initialization of a reference object with a null pointer. The D language compiler always generates code for initializing a reference object which tests if the object is being initialized with a null pointer and, if so, throws an exception.

Line 3 in Table 4 initializes reference object 'd2' to refer to the object found by the call to the 'find' method of the 'aMap' container. If the 'find' method fails to find an object in 'aMap' whose associated key is the character string 'd2', it returns a null pointer. As explained above, this causes an exception to be thrown. The throwing of an exception terminates the forward execution of statements, so no statements after line 3 in Table 4 will be executed in this exceptional situation. This is good, since if execution could proceed, 'd2' would identify a reference object with a null value, which violates the language definition. Throwing an exception safeguards code which assumes that the program adheres to the language definition.

Line 5 in Table 4 is a "namespace using declaration". It declares the identifier 'd1' as a locally scoped identifier which references an object found in 'aMap' with key value equal to the identifier string. Line 5 in Table 4 is semantically equivalent to line 3 in Table 4 (other than the use of 'd1' instead of 'd2'). The differences are purely syntactic. In fact, in compiling line 5 in Table 4, the compiler generates the code on line 3 in Table 4. Line 5 in Table 4 has the same advantage over line 3 in Table 4 as does line 7 in Table 3 over line 4 in Table 3, because of the avoidance of redundant specification of the object identifier.

Except for the fact that they identify different objects, the identifiers 'd1' and 'd2' are semantically and syntactically equivalent. Each references an object found in a map container by its name. Each can be used to manipulate the object it references, in the manner usual in an object-oriented program. Code following each of these lines is protected by the fact that it will not be reached, due to an exception being thrown, if the identifier is not properly initialized to reference an object, as required by the D language definition. This protection is important, since the compiler cannot guarantee at the time it sees the source code whether the map container object will contain the identifiers referenced at run time.

Line 7 is included in Table 4 to illustrate that the syntax for referencing a name in a program namespace is identical to the syntax used on line 5 in Table 4 for referencing a name in a map container object. This sameness is an important feature of the present invention. The syntax of line 7 in Table 4 happens to be identical to the syntax of a "using declaration" in the C++ programming language. This information is provided not as an essential aspect of the invention, but to include as an illustration the similar use of the syntax of line 7 in Table 4 in another programming language, to aid in understanding the entire example.

Map as Symbol Table

Table 5 below is an example of another way in which the contents of the exemplary map container can be referenced.

TABLE 5

```
new Subr_c<? SymbolTable_i (Descriptor_c) aMap ?> M7
({
    using namespace aMap;                    ## line 3
    d2:=d1;                                  ## line 5
});
```

The statement on line 3 in Table 5 (called a "using directive" in the C++ programming language and a Using-Statement in the D programming language) allows the names in 'aMap' to be used without qualification in any statement following line 3 in Table 5, in the scope of the statement.

When the compiler processes line 5 in Table 5 to resolve the identity of the identifiers 'd1' and 'd2', it searches its symbol table for identifiers available according to the rules of the language. For instance, the compiler will search for any or all of the following: locally-declared identifiers; identifiers which are members of the enclosing class, if there is an enclosing class; identifiers in any namespaces included via using directives; and the global namespace.

The present invention enables a compiler to also search for identifiers in a map container object. When generating code for line 5 in Table 5, the compiler first determines that the names 'd1' and 'd2' are not statically defined in any of the above-mentioned places. It determines this in the traditional way, by searching its symbol table. Assuming that the compiler has not found definitions in any of those places, it generates code which, at execution time, for each of 'd1' and 'd2', searches the map container mentioned in the using directive in line 3 in Table 5 ('aMap'), and initializes a reference object for each found, as described earlier. If one or both are not found, the generated code throws an exception.

Thus, the present invention enables the use of names defined in a map container object at execution time to be treated equivalently to names defined statically at compile time.

Note, in all of the above, that this aspect of the present invention is useful with objects in map containers whose corresponding keys are strings which conform to the lexical requirements of identifiers in the programming language in which the invention is incorporated. If a map container contains keys not conforming to the language's lexical requirements, those keys can be found using string objects or string literals as parameters to map 'find' methods, rather than using identifiers, and the rest of the invention remains useful.

Application to Filesystem API

The application of the present invention is open to use in any kind of map, containing any kind of value class. However, the present invention has particular value when applied to certain commonly encountered non-programming namespaces, including filesystems, so-called "environments" containing string variables, key registry systems, etc. The useful application of the present invention to any and all such non-programming namespaces is contemplated. For the sake of illustration of such applications, the application of the present invention to a POSIX filesystem is described, however it is not limited to such.

It is possible in an object-oriented programming language to write a class which represents a filesystem, and which encapsulates the filesystem API so that the filesystem appears to be a set of nested map containers. The map's key class is a string whose values are filenames in the filesystem, and the map's value class is a class representing a filesystem file. Significantly, a subclass of the value class is a directory class. This precisely models the POSIX filesystem, where a directory is a special kind of file. The directory class is also a map container class, whose key class is a string whose values are filenames in the filesystem, and whose value class represents a file. These classes and their relationships are expressed as a Unified Modeling Language (UML) static structure chart of the FIGURE. The Unified Modeling Language is defined in Rumbaugh, James, Ivar Jacobson, and Grady Booch, "The Unified Modeling Language Reference Manual," Reading, Mass., Addison-Wesley, 1999, which is incorporated herein by reference.

Referring to the FIGURE, box 303 is the UML symbol for a parameterized class. This box 303 is labeled Map_i, and represents the interface to the map container class of the example. The dashed box 304 overlapping box 303 shows its two parameters, "key" and "value". The parameter "key" is bound to the class String_c 301, as indicated by the dashed arrow labeled with the UML stereotype <<bind>> from box 301 to box 304. The parameter "value" is bound to the class File_c 302, as indicated by the dashed arrow labeled with the UML stereotype <<bind>> from box 302 to box 304. Class File_c 302 is the class of all files in the filesystem, and is the ancestor class of Dir_c 305, the class of directories. Dir_c 305 is derived from File_c 302 and also implements Map_i 303. These relationships describe a directory as a subclass of file implementing a map from filenames to files. Dir_c 305 therefore inherits and implements methods and attributes of both map containers and files. For instance, objects in instances of Dir_c 305 can be found using the same operations as used to find objects in instances of classes implementing Map_i 303. Likewise, instances of Dir_c 305 can be copied using the same methods as used to copy instances of File_c 302.

The design depicted in the FIGURE is described in the D language in Table 6 below. The names of classes in Table 6 are identical to their corresponding classes in the FIGURE. The source code of Table 6 declares that class Dir_c implements the named members inherited from interface 'SymbolTable_i(File_c)'.

TABLE 6

```
new Class_c Dir_c
(
    class extends (SymbolTable_i (File_c))
        extends (File_c)
    {
        function Subr_c<? String_c id, returns ptrTo (File_c) pF ?> find;
        method Subr_c<? String_c id ?> insert;
        method Subr_c<? File_c f, String_c id (fName) ?> insert;
        method Subr_c<? String_c id ?> remove;
        method Subr_c<? File_c f, String_c id (fName) ?> remove;
    }
);
```

With this definition of class 'Dir_c', as both a map container class and a subclass of file found in the filesystem, code such as that shown in Table 7 below is possible.

TABLE 7

```
new Subr_c<? Dir_c Root ?> M1
({
    ## Copy the file named "a" to the file named "b", both of which are
    ## in Root.
    using Root::a;                              ## line 5
    using Root::b;
    b:= a;
    ## Concatenate file f to the end of file e.
    using Root::e;
    using Root::f;
    f+= e;                                      ## line 12
    ## Copy the file named "d" in the root to the file named "h" in sub-
    ## directory "q".
    using Root::d;
    using (Root::q as Dir_c) ::h;               ## line 17
    h:= d;
});
```

In Table 7, the statement on line 5 causes the locally scoped identifier 'a' to become a reference to the file named "a" in the directory which is passed into the subroutine as argument 'Root'. Line 6 in Table 7 defines 'b' in a similar fashion, and line 7 in Table 7 uses object-oriented operator overloading to express a file copy operation as a simple assignment statement.

Line 12 in Table 7 shows that file operations other than copying, such as concatenation, can also be overloaded onto operators in the language. This is possible because identifiers for file objects are treated identically to identifiers for other objects, even though the namespace for file objects exists outside the programming language.

Line 17 in Table 7 shows a reference to a file "h" in a subdirectory "q" of directory "Root". This is accomplished with a natural recursive extension of the syntax for referencing named objects in a map container. The compiler interprets the statement on line 17 in Table 7 as follows. For the expression 'Root::q', it generates code as described above to find a file object named "q" in the map container identified by 'Root', and bind a pointer to that file to a reference object also named (in the source code) 'q'. At this point, identifier 'q' identifies an object of class 'File_c'. For the expression 'Root::q as Dir_c', the compiler generates code to cast the class of identifier 'q' down the inheritance hierarchy from class 'File_c', its statically known class, to class 'Dir_c'. More specifically, the compiler generates code to verify that the dynamic class of the object identified by 'q' is in fact 'Dir_c', and to throw an exception if this is not true. The compiler considers the static class of the expression '(Root::q as Dir_c)' to be class 'Dir_c'.

Once the reference 'q' has been cast to a reference to an object of class 'Dir_c' as just described, the compiler uses the same method as already described to generate code to find a file object named "h" in the map container identified by 'q', and bind a pointer to that file to a reference object also named (in the source code) 'h'. Line 18 in Table 7 is then a file copy operation, from a file in the 'Root' directory, to a file in subdirectory "q".

The example of Table 7 can be written more simply, as shown in Table 8 below. In Table 8, each directory object is incorporated in its entirety as a namespace, to be searched at execution time.

TABLE 8 new Subr_c<? Dir_c Root ?> M2
({
  ## Bring the root directory into the current namespace.
  using namespace Root;                                ## line 4
  ## Now, names of files and directories in the root directory can be used
  ## without qualification.
  b:= a;                                                  ## line 8
  f+= e;                                                  ## line 10
  using (q as Dir_c) ::h;                       ## line 12
  h:= d;
});

Line 4 of Table 8 makes the directory object called "Root" available for searching as a program namespace (at execution time) for any locally scoped identifier not otherwise defined. It can clearly be seen by examining the remaining lines of Table 8 that there is great notational advantage in the directive of line 4 in Table 8.

The following lines of Table 8 are directly equivalent to lines of Table 7, i.e., Table 8, line 8::Table 7, line 7, Table 8, line 10::Table 7, line 12, Table 8, line 12::Table 7, line 17, and Table 8, line 13::Table 7, line 18.

Thus, the combination of dynamically associating the contents of map objects to source language identifiers, describing non-programming namespaces such as filesystems as map containers, and the ability to overload operations in an object-oriented programming language, leads to an expressive power which allows objects in non-programming namespaces to be treated on a par with objects in programming namespaces.

File Creation and Deletion

The present invention implemented with regard to filesystems allows the same treatment to be accorded the creation and deletion of files as is used with regard to the creation and deletion of objects in a program namespace. Consider the example D language source code of Table 9.

TABLE 9 new Subr_c<? Dir_c Root ?> M3
({
  new life (system) File_c f;                ## line 3
  Root.insert (f);
  using Root::h;                               ## line 6
  Root.remove (h);
});

Line 3 of Table 9 shows the definition of a new object named 'f', of class 'File_c'. This object is defined with a lifetime attribute of 'system', meaning that it could exist as long as the system within which it is defined exists. The D language defines the lifetime of a system to be longer than that of a process, thread, or invocation of a subroutine.

Line 4 of Table 9 invokes the 'insert' method on 'Root', passing as an identifier argument both the string form of the identifier 'f' and a reference to the object identified by 'f'. After execution of 'insert', the 'Root' object contains a reference to the object identified by 'f', uniquely identified within the 'Root' container by the key equal to the string "f". Assuming for this example that the lifetime of 'Root' is also 'system', after the subroutine, thread, and process that created 'f' cease to exist, 'f' continues to exist by virtue of the reference to it in Root.

In accordance with the foregoing specification, line 6 of Table 9 defines 'h' as the identifier of an object in 'Root' with key equal to the string "h". Line 7 of Table 9 invokes the 'remove' method on 'Root', passing a reference to the object identified by 'h' in the container 'Root'. By virtue of the second argument of method 'remove' as shown in Table 6 above, the 'remove' method also receives a string object equal to 'h'. After execution of 'remove', no reference to the object identified by 'h' exists in the container 'Root'. However, the reference introduced by the using declaration of line 6 of Table 9 continues to exist, and therefore so does the object identified by 'h'. When the scope of identifier 'h' is exited, the last reference to the object identified by 'h' ceases to exist, and the object has no references to it. The object is deleted immediately or by garbage collection, depending on the memory management scheme. This behavior exactly simulates the treatment by POSIX-compliant filesystems of files whose filesystem links are removed while the files themselves are open in a program. Such files continue to exist until the programs which have them open exit, at which point they are deleted.

Non-Conformant Filename Access

In order to access files whose names do not conform to the lexical requirements of the source language being used, the common method of finding an object in a map container may still be used. Table 10 below shows such access.

TABLE 10 new Subr_c<? Dir_c Root ?> M10
({
  new ptrTo (File_c) @ d2 (Root.find ("d2.txt"));    ## line 3
  using Root::d1;                                ## line 5
  d1:= d2;                                          ## line 7
});

Line 3 associates identifier 'd2' with an object found in the map container 'Root' using the key string "d2.txt". Identifiers in this source language may not contain periods, as string "d2.txt" does, but this does not prevent source code from being written in the form of line 3 of Table 10, where an object found is mapped to a lexically acceptable identifier in the source language, using a string not conformant to the lexical requirements of the source language for an identifier. Of course, this form of binding an identifier to a file object can be used even if the filename is conformant to the source language's lexical requirements for an identifier.

Lines 5 and 7 of Table 10 are of forms that have already been shown, and illustrate that an identifier bound to an object found in a map container with a key not lexically acceptable as an identifier, may nonetheless be treated in the same manner as any object found or defined with a lexically acceptable identifier.

Traditional File Operations

All of the examples shown above treat file objects as units. Nothing herein prevents file objects from being manipulated in a traditional manner. For example, Table 11 below shows source code to open a file and read it character by character.

TABLE 11

```
new Subr_c<? Dir_c Root ?> M9
({
    ## "Open" the file named "c" for reading,
        and count the number of newline
    ## characters in the file.
    using Root::c;
    new FilePtr_c fpC(c.open("r"));         ## line 6
    new Nat32_t nLinesC(0);
    while (!fpC.eof ( ))
    {
        new BLatin_c ch(*fpC++);
        if(ch == '\n') { ++nLinesC; }
    }
});
```

Line 6 of Table 11 shows the definition of new object 'fpC', a file pointer object, initialized with the result of invoking the 'open' method on an object named 'c'. 'c' is declared on line 5 as an object to be found at run time in directory object 'Root', in accordance with the present invention in the manner described above. The remaining lines of Table 11 define a counter, 'nLinesC', and execute a loop that reads characters one at a time from the file identified by 'c', counting the number of newline characters encountered.

As described above, the present invention can be embodied in the form of computer-implemented processes and apparatuses for practicing those processes. The present invention can also be embodied in the form of computer program code containing instructions embodied in tangible media, such as floppy diskettes, CD-ROM's, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium (embodied in the form of a propagated signal propagated over a propagation medium), such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method of compiling or interpreting a source code comprising:
    defining map container objects having keys, said keys comprising strings conforming to requirements for identifiers;
    using said keys of said map container objects as ordinary identifiers in the source code, said keys identifying objects found as value objects in said map container objects; using said map container objects as namespaces;
    declaring values of said keys as names qualified by said map container objects; and
    generating executable code to locate objects that are identified by said keys, wherein said executable code is executed after said compiling or interpreting said source code.

2. The method of claim 1 wherein said objects are in a filesystem.

3. The method of claim 1 wherein said objects are identified by Uniform Resource Identifiers (URIs).

4. The method of claim 1 wherein said objects are identified by environment variables.

5. The method of claim 1 wherein said objects are identified by run-time object name resolution schemes.

6. A storage medium encoded with machine-readable code, the code including instructions for causing a computer to implement a method of compiling or interpreting a source code comprising:
    defining map container objects having keys, said keys comprising strings conforming to requirements for identifiers;
    using said keys of said map container objects as ordinary identifiers in the source code, said keys identifying objects found as value objects in said map container objects; using said map container objects as namespaces;
    declaring values of said keys as names qualified by said map container objects; and
    generating executable code to locate objects that are identified by said keys, wherein said executable code is executed after said compiling or interpreting said source code.

7. The storage medium of claim 6 wherein said objects are in a filesystem.

8. The storage medium of claim 6 wherein said objects are identified by Uniform Resource Identifiers (URIs).

9. The storage medium of claim 6 wherein said objects are identified by environment variables.

10. The storage medium of claim 6 wherein said objects are identified by run-time object name resolution schemes.

11. A transmission medium comprising electrical wiring, cabling, or fiber optics for propagating an embedded signal encoded with code, the code including instructions for causing a computer to implement a method of compiling or interpreting a source code comprising:
    defining map container objects having keys, said keys comprising strings conforming to requirements for identifiers;
    using said keys of said map container objects as ordinary identifiers in the source code, said keys identifying objects found as value objects in said map container objects; using said map container objects as namespaces;

declaring values of said keys as names qualified by said map container objects; and generating executable code to locate objects that are identified by said keys, wherein said executable code is executed after said compiling or interpreting said source code.

12. The signal propagated over the propagation medium of claim 11 wherein said objects are in a filesystem.

13. The signal propagated over the propagation medium of claim 11 wherein said objects are identified by Uniform Resource Identifiers (URIs).

14. The signal propagated over the propagation medium of claim 11 wherein said objects are identified by environment variables.

15. The signal propagated over the propagation medium of claim 11 wherein said objects are identified by run-time object name resolution schemes.

* * * * *